US011684972B2

(12) United States Patent
Herrmann

(10) Patent No.: US 11,684,972 B2
(45) Date of Patent: *Jun. 27, 2023

(54) METAL DROP EJECTING THREE-DIMENSIONAL (3D) OBJECT PRINTER WITH A THERMALLY INSULATED BUILD PLATFORM TRANSLATIONAL MECHANISM

(71) Applicant: Xerox Corporation, Norwalk, CT (US)

(72) Inventor: Douglas K. Herrmann, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 266 days.

This patent is subject to a terminal disclaimer.

(21) Appl. No.: 17/085,557

(22) Filed: Oct. 30, 2020

(65) Prior Publication Data

US 2022/0134418 A1    May 5, 2022

(51) Int. Cl.
| | |
|---|---|
| B22D 23/00 | (2006.01) |
| B22D 46/00 | (2006.01) |
| B33Y 50/02 | (2015.01) |
| B33Y 30/00 | (2015.01) |
| B22F 12/00 | (2021.01) |
| B22F 12/33 | (2021.01) |

(52) U.S. Cl.
CPC .......... B22D 23/003 (2013.01); B22D 46/00 (2013.01); B22F 12/224 (2021.01); B22F 12/33 (2021.01); B22F 12/38 (2021.01); B33Y 30/00 (2014.12); B33Y 50/02 (2014.12)

(58) Field of Classification Search
CPC ......... B33Y 30/00; B33Y 50/02; B22F 12/33; B22F 12/38; B22F 12/224
See application file for complete search history.

(56) References Cited

U.S. PATENT DOCUMENTS

| | | | |
|---|---|---|---|
| 9,950,474 B2 * | 4/2018 | Batchelder | ............ B29C 64/112 |
| 2017/0252821 A1 | 9/2017 | Sachs et al. | |
| 2018/0141151 A1 | 5/2018 | Liang et al. | |
| 2019/0283136 A1 | 9/2019 | Ruppenthal et al. | |
| 2022/0134418 A1 * | 5/2022 | Herrmann | ............ B22D 23/003 |
| | | | 164/154.6 |
| 2022/0212257 A1 * | 7/2022 | Herrmann | ............... B22F 12/20 |
| 2022/0388063 A1 * | 12/2022 | Herrmann | ............... B22F 10/22 |

* cited by examiner

*Primary Examiner* — Scott R Kastler
(74) *Attorney, Agent, or Firm* — Maginot, Moore & Beck LLP

(57) ABSTRACT

A three-dimensional (3D) metal object manufacturing apparatus has a thermally insulative layer between a platform on which an ejection head ejects drops of melted metal and a X-Y translation mechanism on which the platform is moved within an X-Y plane opposite the ejection head. The apparatus also includes a housing having an internal volume in which the platform and X-Y translation mechanism are located. In one embodiment, the thermally insulative layer is a plurality of spheres made of a thermally insulative material such as a ceramic made of zirconium dioxide or zirconium oxide. The thermally insulative layer protects the X-Y mechanism while the housing helps keep the surface temperature of the object being formed on the platform in an optimal range for bonding of the ejected melted metal drops to the object's surface.

25 Claims, 2 Drawing Sheets

_US 11,684,972 B2_

METAL DROP EJECTING THREE-DIMENSIONAL (3D) OBJECT PRINTER WITH A THERMALLY INSULATED BUILD PLATFORM TRANSLATIONAL MECHANISM

TECHNICAL FIELD

This disclosure is directed to melted metal ejectors used in three-dimensional (3D) object printers and, more particularly, to the thermal insulation of build translations mechanisms for build platforms used in those systems.

BACKGROUND

Three-dimensional printing, also known as additive manufacturing, is a process of making a three-dimensional solid object from a digital model of virtually any shape. Many three-dimensional printing technologies use an additive process in which an additive manufacturing device forms successive layers of the part on top of previously deposited layers. Some of these technologies use ejectors that eject UV-curable materials, such as photopolymers or elastomers. The printer typically operates one or more extruders to form successive layers of the plastic material that form a three-dimensional printed object with a variety of shapes and structures. After each layer of the three-dimensional printed object is formed, the plastic material is UV cured and hardens to bond the layer to an underlying layer of the three-dimensional printed object. This additive manufacturing method is distinguishable from traditional object-forming techniques, which mostly rely on the removal of material from a work piece by a subtractive process, such as cutting or drilling.

Recently, some 3D object printers have been developed that eject drops of melted metal from one or more ejectors to form 3D objects. These printers have a source of solid metal, such as a roll of wire or pellets, that is fed into a heating chamber where the solid metal is melted and the melted metal flows into a chamber of the ejector. The chamber is made of non-conductive material around which an uninsulated electrical wire is wrapped. An electrical current is passed through the conductor to produce an electromagnetic field that causes the meniscus of the melted metal at a nozzle of the chamber to separate from the melted metal within the chamber and be propelled from the nozzle. A platform opposite the nozzle of the ejector is moved in a X-Y plane parallel to the plane of the platform by a controller operating actuators so the ejected metal drops form metal layers of an object on the platform and another actuator is operated by the controller to alter the position of the ejector or platform in the vertical or Z direction to maintain a constant distance between the ejector and an uppermost layer of the metal object being formed. This type of metal drop ejecting printer is also known as a magnetohydrodynamic printer.

One such magnetohydrodynamic printer builds parts with drops exiting the nozzle at ~400 Hz. The bulk metals melted for ejection from the nozzle of this printer include Al 6061, 356, 7075 and 4043. The size of the ejected drops is ~0.5 mm and these drops spread to a size of ~0.7 mm upon contact with the part surface. The melting temperature of these aluminum types is approximately 600° C. Empirical studies have shown that the optimal receiving surface temperature needs to be from ~400° C. to ~550° C. for good adherence to the previously formed surface. At these temperatures the melted metal drops combine with the build part in a uniform way that produces bonds that result in a strong and consistent build structure. When the build surface temperatures fall below 400° C., the drops do not combine as smoothly or with the necessary bonding strength required. This lackluster bonding increases porosity in the part, forms uneven build surfaces, produces unwelded drops, and yields shape inconsistencies. All of these unwanted results lead to degraded physical properties, such as low fatigue strength and tensile strength as well as poor appearance issues in the final part.

As noted above, however, empirical studies have shown that if the temperature of the part is maintained at 400° C. or greater, the build quality is improved over the quality of the parts in which the temperature of the part was maintained at less than 400° C. Providing temperatures in the optimal range is possible using known heating methods such as IR heating, injected heated argon gas, ceramic heaters, convective heating, and the like.

Providing an enclosed environment that enables the part temperature to remain at the optimal level, however, is not a straightforward proposition. The XY translation mechanism used to move the build plate during the build process must be protected from the high temperatures required for building the parts. This thermal protection needs to move fluidly with the build platform moved by the XY translation mechanism within a confined enclosure to ensure adequate thermal insulation regardless the position of the build platform. Additionally, the high temperatures optimal for melted metal drop bonding with previously formed layers can degrade the life of the XY translation mechanism. Being able to configure an environment for production of a metal part using melted metal drops that ensures optimal temperatures for metal drop bonding without adversely impacting the life of the build platform XY translation mechanism would be beneficial.

SUMMARY

A new 3D metal object printer provides an environment for production of a metal part using melted metal drops that ensures optimal temperatures for metal drop bonding without adversely impacting the life of the build platform XY translation mechanism. The 3D metal object printer includes an ejection head, a platform positioned opposite the ejection head, a heater configured to direct heat toward the platform, a translation mechanism configured to move the platform, a housing that encloses an internal volume in which the translation mechanism and platform are located, a first actuator operatively connected to the platform, the actuator being configured to operate the translation mechanism to move the platform within the housing, and a plurality of thermally insulative members positioned in a portion of the internal volume of the housing between the platform and the floor of the housing.

Another 3D metal object printer that provides an environment for production of a metal part using melted metal drops while ensuring optimal temperatures for metal drop bonding without adversely impacting the life of the build platform XY translation mechanism includes an ejection head configured for fluid connection to a source of melted bulk metal, a platform positioned opposite the ejection head, a heater configured to direct heat toward the platform, a X-Y translation mechanism configured to move the platform in an X-Y plane parallel to the platform, a housing having at least one wall and a floor that encloses an internal volume in which the X-Y mechanism and platform are located, a first actuator operatively connected to the platform, the actuator being configured to operate the X-Y translation mechanism to move the platform in the X-Y plane, a second actuator operatively connected to the ejection head, the second actuator being configured to move the ejection head bidirectionally along an axis perpendicular to the X-Y plane within the internal volume of the housing, a plurality of thermally insulative members positioned in a portion of the internal volume of the housing between the platform and the floor of the housing, and a controller operatively connected to the heater, the first actuator, the second actuator, and the ejection head. The controller is configured to operate the first actuator to operate the X-Y mechanism to move the platform in the X-Y plane within the internal volume of the housing, operate the heater to direct heat toward the platform to maintain an upper surface temperature for the object being formed on the platform within a temperature range of about 400° C. to about 550° C., and operate the ejection head to eject drops of melted bulk metal to form a metal object on the platform.

BRIEF DESCRIPTION OF THE DRAWINGS

The foregoing aspects and other features of a 3D metal object printer that provides an environment for production of a metal part using melted metal drops that ensures optimal temperatures for metal drop bonding without adversely impacting the life of the build platform XY translation mechanism are explained in the following description, taken in connection with the accompanying drawings.

DETAILED DESCRIPTION

Figure 1:
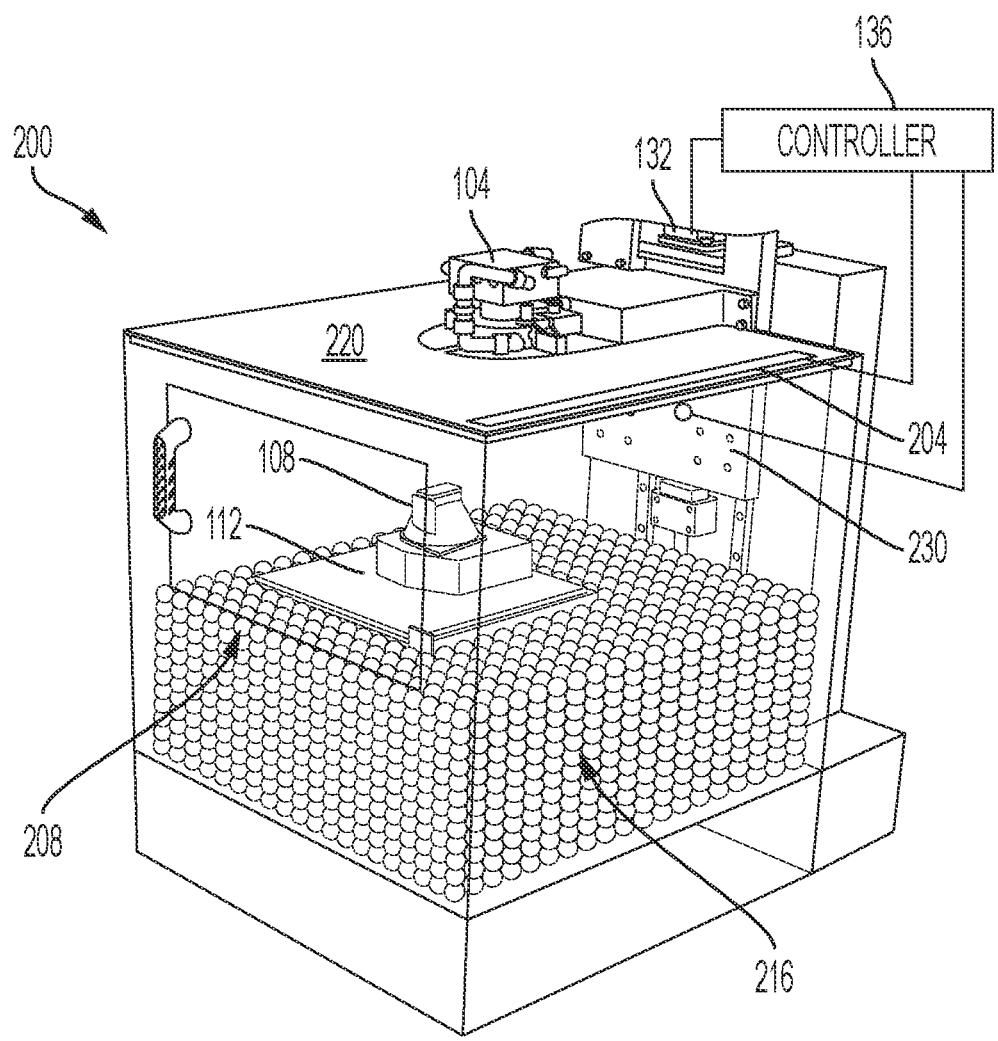
FIG. 1 depicts 3D metal object printer that includes thermal insulation adequate to protect the XY translation mechanism for the build platform while enabling the part being formed to maintain a temperature in an optimal range for metal drop bonding to previously formed part layers.

For a general understanding of the environment for the 3D metal object printer and its operation as disclosed herein as well as the details for the printer and its operation, reference is made to the drawings. In the drawings, like reference numerals designate like elements.

Figure 2:
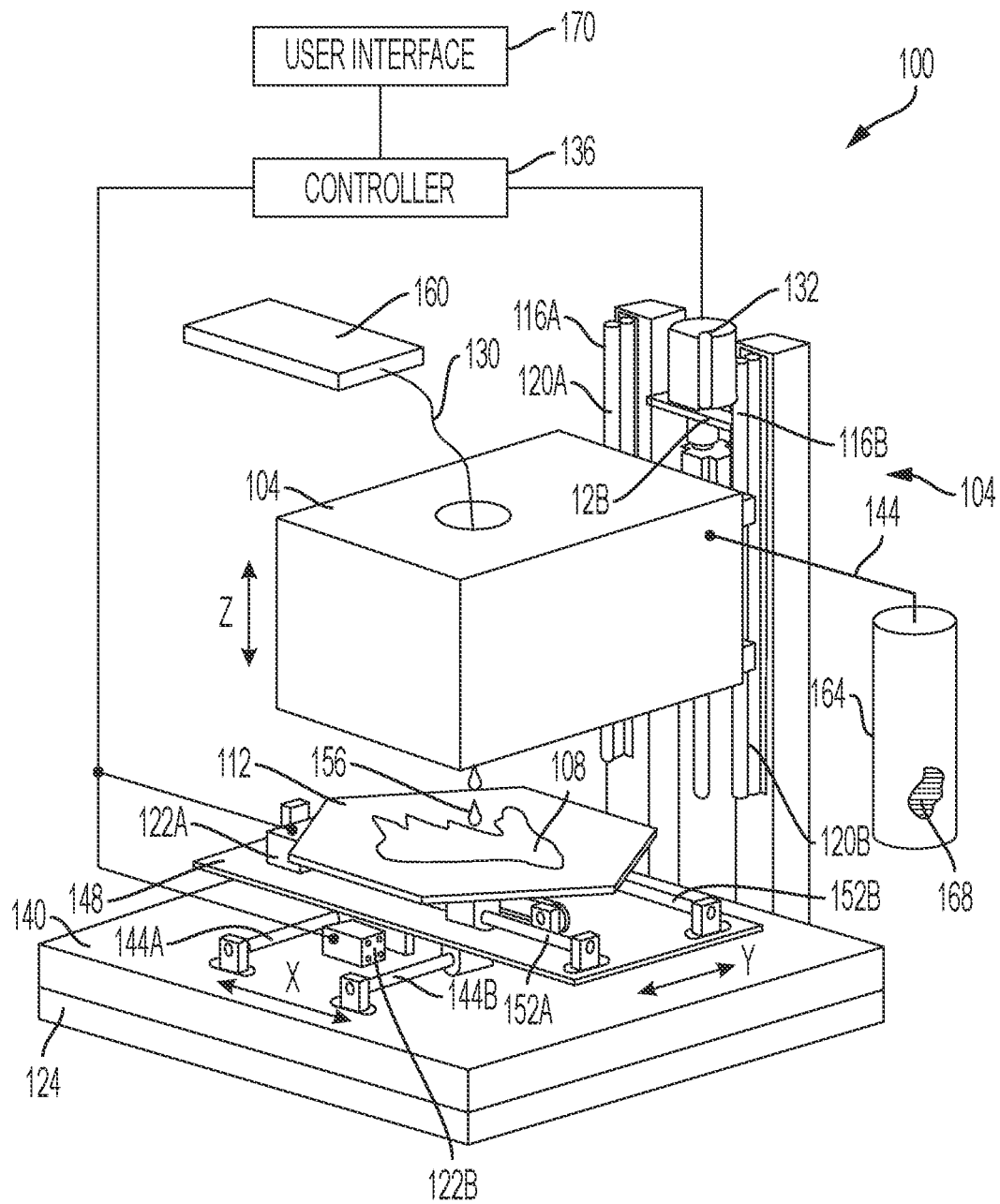
FIG. 2 depicts a previously known 3D metal object printer that cannot maintain the temperature of a part being built in an optimal range for metal drop bonding to previously formed part layers.

FIG. 2 illustrates an embodiment of a prior art melted metal 3D object printer 100 that can be modified to produce the 3D metal object printer of FIG. 1. In this embodiment, drops of melted bulk metal are ejected from a ejector head 104 having a single nozzle, although the ejector head can be configured with a plurality of nozzles, and the ejected drops form swaths for layers of an object 108 on a platform 112. As used in this document, the term "bulk metal" means conductive metal available in aggregate form, such as wire of a commonly available gauge or pellets of macro-sized proportions. A source of bulk metal 160, such as metal wire 130, is fed into the ejector head and melted to provide melted metal for a chamber within the ejector head. An inert gas supply 164 provides a pressure regulated source of an inert gas 168, such as argon, to the chamber of melted metal in the ejector head 104 through a gas supply tube 144 to prevent the formation of metal oxide in the ejector head.

The ejector head 104 is movably mounted within z-axis tracks 116A and 116B in a pair of vertically oriented members 120A and 120B, respectively. Members 120A and 120B are connected at one end to one side of a frame 124 and at another end to one another by a horizontal member 128. An actuator 132 is mounted to the horizontal member 128 and operatively connected to the ejector head 104 to move the ejector head along the z-axis tracks 116A and 166B. The actuator 132 is operated by a controller 136 to maintain a distance between the nozzle (not shown in FIG. 2) of the ejector head 104 and an uppermost surface of the object 108 on the platform 112.

Mounted to the frame 124 is a planar member 140, which can be formed of granite or other sturdy material to provide reliably solid support for movement of the platform 112. Platform 112 is affixed to X-axis tracks 144A and 144B so the platform 112 can move bidirectionally along an X-axis as shown in the figure. The X-axis tracks 144A and 144B are affixed to a stage 148 and stage 148 is affixed to Y-axis tracks 152A and 152B so the stage 148 can move bidirectionally along a Y-axis as shown in the figure. Actuator 122A is operatively connected to the platform 112 and actuator 122B is operatively connected to the stage 148. Controller 136 operates the actuators 122A and 122B to move the platform along the X-axis and to move the stage 148 along the Y-axis to move the platform in an X-Y plane that is opposite the ejector head 104. Performing this X-Y planar movement of platform 112 as drops of molten metal 156 are ejected toward the platform 112 forms a swath of melted metal drops on the object 108. Controller 136 also operates actuator 132 to adjust the vertical distance between the ejector head 104 and the most recently formed layer on the substrate to facilitate formation of other structures on the object. While the molten metal 3D object printer 100 is depicted in FIG. 2 as being operated in a vertical orientation, other alternative orientations can be employed. Also, while the embodiment shown in FIG. 2 has a platform that moves in an X-Y plane and the ejector head moves along the Z axis, other arrangements are possible. For example, the ejector head 104 can be configured for movement in the X-Y plane and along the Z axis. Additionally, for an embodiment of the ejector head 104 having a plurality of nozzles, the ejector head can configured with an array of valves (not shown) associated with the nozzles in a one-to-one correspondence to provide independent and selective control of the ejections from each of the nozzles.

The controller 136 can be implemented with one or more general or specialized programmable processors that execute programmed instructions. The instructions and data required to perform the programmed functions can be stored in memory associated with the processors or controllers. The processors, their memories, and interface circuitry configure the controllers to perform the operations previously described as well as those described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits. During metal object formation, image data for a structure to be produced are sent to the processor or processors for controller 136 from either a scanning system or an online or work station connection for processing and generation of the ejector head control signals output to the ejector head 104.

The controller 136 of the melted metal 3D object printer 100 requires data from external sources to control the printer for metal object manufacture. In general, a three-dimensional model or other digital data model of the object to be formed is stored in a memory operatively connected to the controller 136, the controller can access through a server or the like a remote database in which the digital data model is stored, or a computer-readable medium in which the digital data model is stored can be selectively coupled to the controller 136 for access. This three-dimensional model or other digital data model can be used by the controller to generate machine-ready instructions for execution by the controller 136 in a known manner to operate the components of the printer 100 and form the metal object corresponding to the model. The generation of the machine-ready instructions can include the production of intermediate models, such as when a CAD model of the device is converted into an STL data model, or other polygonal mesh or other intermediate representation, which can in turn be processed to generate machine instructions, such as g-code, for fabrication of the device by the printer. As used in this document, the term "machine-ready instructions" means computer language commands that are executed by a computer, microprocessor, or controller to operate components of a 3D metal object additive manufacturing system to form metal objects on the platform 112. The controller 136 executes the machine-ready instructions to control the ejection of the melted metal drops from the ejector head 104, the positioning of stage 148 and the platform 112, as well as the distance between the ejector head 102 and the uppermost layer of the object 108 on the platform 112.

FIG. 1 illustrates an embodiment of a melted metal 3D object printer 100 that provides an environment for production of a metal part using melted metal drops that ensures optimal temperatures for metal drop bonding without adversely impacting the life of the build platform X-Y translation mechanism. In the description of this printer, like reference numbers for components discussed above with reference to FIG. 2 are used for like components in the printer of FIG. 1. The printer 200 includes an ejection head 104 that is mounted on a support plate 204. The ejection head 104 and the support plate 204 are configured to move vertically bidirectionally along the Z axis by operation of the actuator 132. The support plate moves within an internal volume of a housing 208 formed by four standing walls to form a rectangularly shaped housing. The housing 208 in FIG. 1 is made of a transparent material to facilitate viewing of the internal volume of the housing, although the housing can be made of translucent or opaque materials and can have shapes other than the rectangular shape shown in the figure. The wall or walls forming the housing enclose the internal volume except for the upper opening in which the support plate 204 fits. The clearance between the edges of the support plate 204 and the walls of the housing 208 are relatively tight to help hold heat within the housing. The wall or walls of the housing 208 are made of a heat resistant material, such as quartz glass. One or more heating elements 220 are mounted to the side of support plate 204 that faces the internal volume of the housing 208. These heating elements can be infrared heaters, outlets for noble gases heated outside of the housing, ceramic heaters, convective heaters, and the like. In one embodiment, eight millimeter heating tubes made by Heraeus Noblelight of Gaithersburg, Md. form the heating elements mounted to the support plate 204. Also, a temperature sensor 230 is operatively connected to the controller 136 to provide the controller with a signal indicative of the temperature within the volume of the housing 208. The controller 136 is configured to compare the signal from the sensor 230 to an upper temperature limit and lower temperature limit for the internal volume of the housing that maintains the object surface temperature in the range of about 400° to about 550° C.

With continued reference to FIG. 1 and FIG. 2, platform 112 on which the object 108 is formed is supported by the planar member 140 and the X-Y translation mechanism as described above with reference to FIG. 2. As noted above with respect to FIG. 2, controller 136 operates the actuators 122A and 122B to move the platform along the X-axis and to move the stage 148 along the Y-axis to move the platform in an X-Y plane that is opposite the ejector head 104. Performing this X-Y planar movement of platform 112 as drops of molten metal 156 are ejected toward the platform 112 forms a swath of melted metal drops on the object 108. This X-Y translation mechanism is not visible in FIG. 1, however, because a plurality of thermally insulative spheres 216 fill the space between the floor of the housing 208 on the base 216 and the bottom of the platform 112. These thermally insulative spheres provide a flexible and fluid thermal insulation layer that moves and conforms to the movement of platform 112 while providing full insulated coverage for the X-Y mechanism. As the platform slides along the members of the X-Y mechanism, the ceramic spheres are moved. Although the embodiment of FIG. 1 depicts spherical balls of the insulative material, other shapes are possible provided they facilitate frictionless movement of the thermally insulative members with respect to one another and with the components of the X-Y translation mechanism.

The size of the individual spheres can be optimized for different embodiments of the printer 200. In one embodiment, spheres having a diameter of about 5 mm are used, although the diameter of the spheres can be in a range of about 1/16 of an inch to about 1/2 of an inch or in a range of about 2 mm to about 6 mm. Known industrial thermally insulative materials are rated to temperatures of 1100° C. and higher. The material forming the thermally insulative members should be hard, chemically non-reactive, non-porous, and have a thermal conductivity in a range of about 1.8 W/m·K to about 2.2 W/m·K or higher. Ceramic spheres made of zirconium dioxide or zirconium oxide and having a diameter of 5 mm are an example of such members and are available from BC Precision in Chattanooga, Tenn. Ceramic members are non-porous so their surfaces are essentially frictionless. The housing also helps maintain the temperature of the object 108 within the optimal range of about 400° C. to about 550° C. because it encloses the space around the object and helps prevent the loss of heat from the internal volume of the housing 208. The dimensions of the internal volume of the housing 208 can be optimized to help balance the parameters affecting temperatures within the internal volume of the housing.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A metal drop ejecting apparatus comprising:
   an ejection head;
   a platform positioned opposite the ejection head;
   a heater configured to direct heat toward the platform;
   a translation mechanism configured to move the platform;
   a housing that encloses an internal volume in which the translation mechanism and platform are located;

a first actuator operatively connected to the platform, the actuator being configured to operate the translation mechanism to move the platform within the housing; and a plurality of thermally insulative members positioned in a portion of the internal volume of the housing between the platform and a floor of the housing.

2. The apparatus of claim 1 wherein the ejection head is configured for fluid connection to a source of melted bulk metal.

3. The apparatus of claim 2 wherein the translation mechanism is a X-Y translation mechanism configured to move the ejection head in an X-Y plane parallel to the platform and positioned between the ejection head and the platform.

4. The apparatus of claim 3 wherein the housing has at least one wall, the wall and the floor of the housing encloses an internal volume in which the X-Y translation mechanism and the platform are located.

5. The apparatus of claim 4 further comprising:
a second actuator operatively connected to the ejection head, the second actuator being configured to move the ejection head bidirectionally along an axis perpendicular to the X-Y plane within the internal volume of the housing.

6. The apparatus of claim 5 further comprising:
a controller operatively connected to the heater, the first actuator, the second actuator, and the ejection head, the controller being configured to:
operate the first actuator to operate the X-Y mechanism to move the ejection head in the X-Y plane within the internal volume of the housing;
operate the heater to direct heat toward the platform; and
operate the ejection head to eject drops of melted bulk metal to form a metal object on the platform.

7. The apparatus of claim 6, the controller being further configured to operate the heater to maintain an upper surface temperature for the object being formed on the platform within a temperature range of about 400° C. to about 550° C.

8. The apparatus of claim 7 further comprising:
a temperature sensor configured to generate a signal indicative of a temperature within the internal volume of the housing; and
the controller is further configured to compare the signal generated by the temperature sensor to an upper temperature limit and a lower temperature limit to operate the heater and maintain the upper surface of the object being formed in the temperature range of about 400° C. to about 550° C.

9. The apparatus of claim 8 wherein the heater is an infrared heating tube.

10. The apparatus of claim 8 wherein the heater is a convective or ceramic heater.

11. The apparatus of claim 1 wherein each thermally insulative member has a spherical shape.

12. The apparatus of claim 1 wherein each thermally insulative member has a thermal conductivity in a range of about 1.8 W/m·K to about 2.2 W/m·K.

13. The apparatus of claim 1 wherein each thermally insulative member has a diameter of about 1/16 of an inch to about 1/2 of an inch or about 2 mm to about 6 mm.

14. The apparatus of claim 13 wherein each thermally insulative member has a diameter of about 5 mm.

15. The apparatus of claim 1 wherein each thermally insulative member is formed of a material including a ceramic that includes zirconium dioxide or zirconium oxide.

16. The apparatus of claim 15 wherein each thermally insulative member has a spherical shape.

17. The apparatus of claim 16 wherein each spherical thermally insulative member has a diameter in a range of about 2 mm to about 6 mm.

18. The apparatus of claim 1 wherein the housing is formed of a material including quartz glass.

19. A metal drop ejecting apparatus comprising:
an ejection head configured for fluid connection to a source of melted bulk metal;
a platform positioned opposite the ejection head;
a heater configured to direct heat toward the platform;
a X-Y translation mechanism configured to move the platform in an X-Y plane parallel to the platform;
a housing having at least one wall and a floor that encloses an internal volume in which the X-Y mechanism and platform are located;
a first actuator operatively connected to the platform, the actuator being configured to operate the X-Y translation mechanism to move the platform in the X-Y plane;
a second actuator operatively connected to the ejection head, the second actuator being configured to move the ejection head bidirectionally along an axis perpendicular to the X-Y plane within the internal volume of the housing;
a plurality of thermally insulative members positioned in a portion of the internal volume of the housing between the platform and the floor of the housing; and
a controller operatively connected to the heater, the first actuator, the second actuator, and the ejection head, the controller being configured to:
operate the first actuator to operate the X-Y mechanism to move the platform in the X-Y plane within the internal volume of the housing;
operate the heater to direct heat toward the platform to maintain an upper surface temperature for the object being formed on the platform within a temperature range of about 400° C. to about 550° C.; and
operate the ejection head to eject drops of melted bulk metal to form a metal object on the platform.

20. The apparatus of claim 19 further comprising:
a temperature sensor configured to generate a signal indicative of a temperature within the internal volume of the housing; and
the controller is further configured to compare the signal generated by the temperature sensor to an upper temperature limit and a lower temperature limit to operate the heater and maintain the upper surface of the object being formed in the temperature range of about 400° C. to about 550° C.

21. The apparatus of claim 20 wherein the heater is an infrared heating tube.

22. The apparatus of claim 21 wherein each thermally insulative member has a thermal conductivity in a range of about 1.8 W/m·K to about 2.2 W/m·K.

23. The apparatus of claim 22 wherein each thermally insulative member has a spherical shape.

24. The apparatus of claim 23 wherein each thermally insulative member is formed of a material including a ceramic that includes zirconium dioxide or zirconium oxide.

25. The apparatus of claim 24 wherein the housing is formed of a material including quartz glass.

* * * * *